United States Patent
Ono

(10) Patent No.: US 7,320,256 B2
(45) Date of Patent: *Jan. 22, 2008

(54) LOAD MEASUREMENT ON ROLLING BEARING WITH PARTICULAR REVOLUTION SPEED MEASUREMENTS

(75) Inventor: Koichiro Ono, Kanagawa (JP)

(73) Assignee: NSK Ltd., Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 10/534,748

(22) PCT Filed: Aug. 26, 2004

(86) PCT No.: PCT/JP2004/012679

§ 371 (c)(1),
(2), (4) Date: May 12, 2005

(87) PCT Pub. No.: WO2005/026680

PCT Pub. Date: Mar. 24, 2005

(65) Prior Publication Data

US 2006/0042406 A1 Mar. 2, 2006

(30) Foreign Application Priority Data

Sep. 12, 2003 (JP) ............................ P2003-321049

(51) Int. Cl.
*G01L 1/00* (2006.01)

(52) U.S. Cl. ............................ 73/862.541; 73/862.322

(58) Field of Classification Search ........... 73/862.322, 73/862.541
See application file for complete search history.

(56) References Cited

U.S. PATENT DOCUMENTS 5,877,433 A * 3/1999 Matsuzaki et al. ..... 73/862.381
6,471,407 B1 * 10/2002 Katano ....................... 384/448

FOREIGN PATENT DOCUMENTS

| GB | 2 382 142 A | 5/2003 |
|---|---|---|
| JP | 62-3365 B2 | 1/1987 |
| JP | 3-209016 A | 9/1991 |
| JP | 2001-21577 A | 1/2001 |
| JP | 2003-130762 A | 5/2003 |
| JP | 2003-279425 A | 10/2003 |
| JP | 2004-45219 A | 2/2004 |
| WO | WO 2004/072598 A1 | 8/2004 |

* cited by examiner

*Primary Examiner*—Edward Lefkowitz
*Assistant Examiner*—Freddie Kirkland, III
(74) *Attorney, Agent, or Firm*—Sughrue Mion, Pllc.

(57) ABSTRACT

Revolution speeds of rolling elements in respective rows are sensed, and then the axial load or the radial load is derived based on the revolution speeds. In case the acting directions of these loads are displaced, the contact angles of the rolling elements in respective rows are differentiated in response to this displacement, or values of influence coefficients used to detect respective loads are changed based on the revolution speeds.

6 Claims, 11 Drawing Sheets

LOAD MEASUREMENT ON ROLLING BEARING WITH PARTICULAR REVOLUTION SPEED MEASUREMENTS

TECHNICAL FIELD

A load measuring unit for a rolling bearing unit according to the present invention relates to improvement in the rolling bearing unit used to support a wheel of a mobile body such as a car, a railway vehicle, various carrier cars, and so forth, for example, and is utilized to secure the running stability of the mobile body by measuring loads (a radial load, an axial road) applied to this rolling bearing unit.

BACKGROUND ART

For instance, the wheels of the car are rotatably supported with the suspension system via the double row angular contact ball bearing unit. Also, in order to secure the running stability of the car, the vehicle running stabilizing system such as the anti-lock brake system (ABS) or the traction control system (TCS), the vehicle stability control system (VSC), or the like is employed. In order to control such vehicle running stabilizing system, various signals such as rotational speeds of the wheels, accelerations applied to the car body from respective directions, and so on are required. Then, In order to execute higher control, in some cases it is preferable to know a magnitude of the load (one or both of the radial load and the axial load) applied to the rolling bearing unit via the wheel.

In light of such circumstances, in JP-A-2001-21577, the rolling bearing unit equipped with the load measuring unit capable of measuring the radial load is set forth. The rolling bearing unit equipped with the load measuring unit in this first example in the related art measures the radial load and is constructed as shown in FIG. 17. A hub 2 that is a rotating ring, to which the wheel is coupled and fixed, and corresponds to an inner ring equivalent member is supported on the inner diameter side of an outer ring 1 that is a stationary ring, which is supported with the suspension system, and corresponds to an outer ring equivalent member. This hub 2 has a hub main body 4 and an inner ring 6. Such hub main body 4 has a rotary-side flange 3, to which the wheel is fixed, on its outer end portion in the axial direction (where "the outside in the axial direction" means the outside in the width direction in the fitted state to the vehicle. This is true throughout the present specification and the claims.). Such inner ring 6 is fitted onto the inner end portion of this hub main body 4 (where "the inside in the axial direction" means the center side in the width direction in the fitted state to the vehicle. This is true throughout the present specification and the claims.), and then fixed with nuts 5. Then, a plurality of rolling elements 9a, 9b are arranged respectively between double row outer ring raceways 7, 7 formed on the inner peripheral surface of the outer ring 1 as the stationary-side raceway respectively and double row inner ring raceways 8, 8 formed on the outer peripheral surface of the hub 2 as the rotating-side raceway respectively, so that the hub 2 can be rotated on the inner diameter side of the outer ring 1.

A fitting hole 10 passing through the outer ring 1 in the diameter direction is formed in the middle portion of the outer ring 1 between the double row outer ring raceways 7, 7 along the axial direction in the direction almost perpendicular to the top end portion of this outer ring 1. Then, a circular lever-like (rod-like) displacement sensor 11 serving as a load measuring sensor is fitted into the fitting hole 10. This displacement sensor 11 is of non-contact type, and a sensing surface provided to a top end surface (lower end surface) is faced closely to an outer peripheral surface of a sensor ring 12 that is fitted and fixed onto the middle portion of the hub 2 in the axial direction. The displacement sensor 11 outputs a signal in response to an amount of change when a distance between the sensing surface and the outer peripheral surface of the sensor ring 12 is changed.

In the case of the rolling bearing unit equipped with the load measuring unit constructed as above in the related art, the load applied to the rolling bearing unit can be derived based on the sensed signal of the displacement sensor 11. More particularly, the outer ring 1 supported with the suspension system of the vehicle is pushed downward by the weight of the vehicle whereas the hub 2 onto which the wheel is supported and fixed tends to still remain in that position as it is. For this reason, a displacement between a center of these outer rings 1 and a center of the hub 2 is increased larger based on elastic deformations of the outer ring 1 and the hub 2 and the rolling elements 9a, 9b whenever a weight is increased larger. Then, a distance between the sensing surface of the displacement sensor 11, which is provided to the top end portion of the outer ring 1, and the outer peripheral surface of the sensor ring 12 is shortened smaller as the weight is increased larger. Therefore, if a sensing signal of the displacement sensor 11 is sent to a controller, the radial load applied to the rolling bearing unit into which the displacement sensor 11 is incorporated can be calculated from a relational expression, a map, or the like derived previously by the experiment, or the like. According to the loads applied to respective rolling bearing units derived in this manner, not only can the ABS be properly controlled but also the failure of the carrying state can be informed of the driver.

In this case, the related-art structure shown in FIG. 17 makes it possible to sense the rotational speed of the hub 2 in addition to the load applied to the rolling bearing unit. For this purpose, a sensor rotor 13 fitted and fixed onto the inner end portion of the inner ring 6, and also a rotational speed sensor 15 is supported by a cover 14 attached to the inner end opening portion of the outer ring 1. Then, a sensing portion of the rotational speed sensor 15 is opposed to a sensed portion of the sensor rotor 13 via a sensed clearance.

In operation of this rolling bearing unit equipped with the rotational speed sensor as described above, an output of this rotational speed sensor 15 is changed when the sensor rotor 13 together with the hub 2 to which the wheel is fixed is rotated and then the sensed portion of the sensor rotor 13 passes through the close vicinity of the sensing portion of the rotational speed sensor 15. A frequency at which the output of the rotational speed sensor 15 is changed in this manner is in proportion to the number of revolution of the wheel. Therefore, the ABS or the TCS can be controlled appropriately by feeding an output signal of the rotational speed sensor 15 to the not-shown controller.

The rolling bearing unit equipped with the load measuring unit in the above first example of the related-art configurations is used to measure the radial load applied to the rolling bearing unit. Also, the structure to measure the axial load applied to the rolling bearing unit is set forth in JP-A-3-209016, and the like and known in the related art. FIG. 18 shows the rolling bearing unit equipped with the load measuring unit set forth in JP-A-3-209016 as mentioned the above and used to measure the axial load. In the case of the second example of the related-art configurations, a rotary-side flange 3a used to support the wheel is provided to an outer peripheral surface of an outer end portion of a hub 2a as the rotating ring and the inner ring equivalent member.

Also, a stationary-side flange 17 used to support/fix an outer ring 1a to a knuckle 16 constituting the suspension system is provided to an outer peripheral surface of the outer ring 1a as the stationary ring and the outer ring equivalent member. Then, a plurality of rolling elements 9a, 9 are provided rotatably between the double row outer ring raceways 7, 7 formed on the inner peripheral surfaces of the outer ring 1a and the double row inner ring raceways 8, 8 formed on the outer peripheral surfaces of the hub 2a respectively, whereby the hub 2a can be supported rotatably on the inner diameter side of the outer ring 1a.

In addition, a load sensor 20 is affixed to plural locations on the inner-side surface of the stationary-side flange 17 to surround a screwed hole 19, into which a bolt 18 is screwed to couple the stationary-side flange 17 to the knuckle 16, respectively. These load sensors 20 are put between the outer-side surface of the knuckle 16 and the inner-side surface of the stationary-side flange 17 in a state that the outer ring 1a is supported/fixed to the knuckle 16.

In the case of the load measuring unit for the rolling bearing unit in the above second example of the related-art configurations, the outer-side surface of the knuckle 16 and the inner-side surface of the stationary-side flange 17 push strongly against respective load sensors 20 mutually from both surfaces in the axial direction whenever the axial load is applied between the not-shown wheel and the knuckle 16. Therefore, the axial load applied between the wheel and the knuckle 16 can be sensed by summing up measured values derived from these load sensors 20. Also, in JP-B-62-3365, although not shown, the method of deriving the revolution speed of the rolling elements based on a vibration frequency of the outer ring equivalent member, a rigidity in a part of which is lowered, and also measuring the axial load applied to the rolling bearing is set forth.

In the case of the first example of the related-art structures shown in above FIG. 17, the load applied to the rolling bearing unit is measured by sensing displacements of the outer ring 1 and the hub 2 in the radial direction by means of the displacement sensor 11. In this case, because an amount of displacement in the radial direction is very minute, a high-precision sensor must be employed as the displacement sensor 11 to measure this load with good precision. Since a high-precision non-contact type sensor is expensive, it is inevitable that a cost of the rolling bearing unit equipped with the load measuring unit is increased as a whole.

Also, in the case of the second example of the related-art structures shown in above FIG. 18, the load sensors 20 must be provided as many as the bolts 18 that are used to support/fix the outer ring 1a to the knuckle 16. As a result, because of this situation together with the above situation that the load sensors 20 themselves are expensive, it is inevitable that a cost of the overall rolling bearing unit equipped with the load measuring unit is considerably increased. Also, because the rigidity in a part of the outer ring equivalent member must be lowered to apply the method set forth in JP-B-62-3365 as mentioned the above, it is possible that security of the durability of the outer ring equivalent member becomes difficult.

DISCLOSURE OF THE INVENTION

The present invention has been made in view of the above circumstances, and an object of the present invention to provide a load measuring unit for a rolling bearing unit, capable of measuring the load with good precision by reducing an influence of a displacement of the load upon a relationship between a variation of the load and an amount of change in revolution speeds of rolling elements in respective rows even though an acting direction of a radial load or an axial load applied to the rolling bearing unit is displaced.

Each of load measuring units for a rolling bearing unit of the present invention comprises a stationary ring, a rotating ring, a rolling element, at least a pair of revolution speed sensors, and a calculator.

Out of them, the stationary ring is not rotated in use.

Also, the rotating ring is arranged concentrically with the stationary ring and is rotated in use.

Also, the rolling element is provided in plural rotatably between stationary-side raceways and rotating-side raceways, which are formed on mutual opposing portions of the stationary ring and the rotating ring in two rows or more respectively, respectively to direct a contact angle in an opposite direction mutually at least between a pair of rows.

Also, the revolution speed sensors senses revolution speeds of rolling elements, directions of contact angles of which are different mutually, in a pair of rows respectively.

Also, the calculator calculates a load applied between the stationary ring and the rotating ring based on sensed signals fed from the revolution speed sensors.

Then, in the case of the load measuring unit for a rolling bearing unit according to a first aspect of the present invention, an influence of a displacement of the load applied between the stationary ring and the rotating ring upon a relationship between a variation of the load and an amount of change in the revolution speeds of the rolling elements in respective rows is reduced by differentiating mutually the contact angles of the rolling elements in respective rows. In this case, the contact angles are differentiated mutually under the condition the axial load or the displaced radial load is not applied to the rolling bearing unit, i.e., in the as-assembled state of this rolling bearing unit.

Also, in the case of a load measuring unit for a rolling bearing unit according to a second aspect of the present invention, an expression representing a relationship between a variation of the load and an amount of change in the revolution speeds of the rolling elements in respective rows based on a displacement of the load applied between the stationary ring and the rotating ring is installed into the calculator. Then, an influence of the displacement of the load applied between the stationary ring and the rotating ring upon the relationship between the variation of the load and the amount of change in the revolution speeds of the rolling elements in respective rows is reduced by calculating the load based on the expression.

According to the load measuring unit for the rolling bearing unit of the present invention constructed as above, it is feasible not to generate a large difference between a value of the calculated radial load or axial load and a value of the actually acting radial load or axial load even though the radial load does not act on the center position and its vicinity between both rows in the axial direction of the rolling bearing unit or even though the axial load does not act on the center portion (the center axis) and its vicinity of this rolling bearing unit. As a result, the running stability of the mobile body such as the car, or the like, for example, can be secured at a high level.

In case the present invention is implemented, in accordance with a third aspect of the present invention, preferably the rotating ring is a hub that fixes a wheel of a car to a rotary-side flange, which is fixed to an outer peripheral surface of an outer end portion in an axial direction, to rotate together with the wheel.

When constructed in this manner, a VSC control signal is obtained and the running stability of the car can be effectively secured.

In case the invention of the first aspect is implemented in this case, the contact angles of the rolling element in an inner tow in the axial direction are set larger than the contact angles of the rolling element in an outer row in the axial direction.

Also, according to a fourth aspect of the present invention, preferably one raceway ring out of the stationary ring and the rotating ring is an outer ring equivalent member, other raceway ring is an inner ring equivalent member, each rolling element is a ball, and a back-to-back arrangement type contact angle is given to a ball provided in plural respectively between double row angular contact inner ring raceways formed on an outer peripheral surface of the inner ring equivalent member and double row angular contact outer ring raceways formed on an inner peripheral surface of the outer ring equivalent member.

When constructed in this manner, the load measurement based on the revolution speeds can be effectively executed by changing the revolution speeds of the rolling elements (balls) in respective rows without fail noticeably in response to the variation of the load.

Also, according to a fifth aspect of the present invention, preferably the calculator calculates the rotational speed of the rotating ring based on signals fed from the rotational speed sensors that are used to sense the rotational speed of the rotating ring. Then, the calculator calculates the load applied between the stationary ring and the rotating ring based on ratios of the revolution speeds of the rolling elements in respective rows to the rotational speed.

When constructed in this manner, the load can be derived precisely regardless of the variation of the rotational speed of the rotating ring.

BEST MODE FOR CARRYING OUT THE INVENTION

Figure 17:
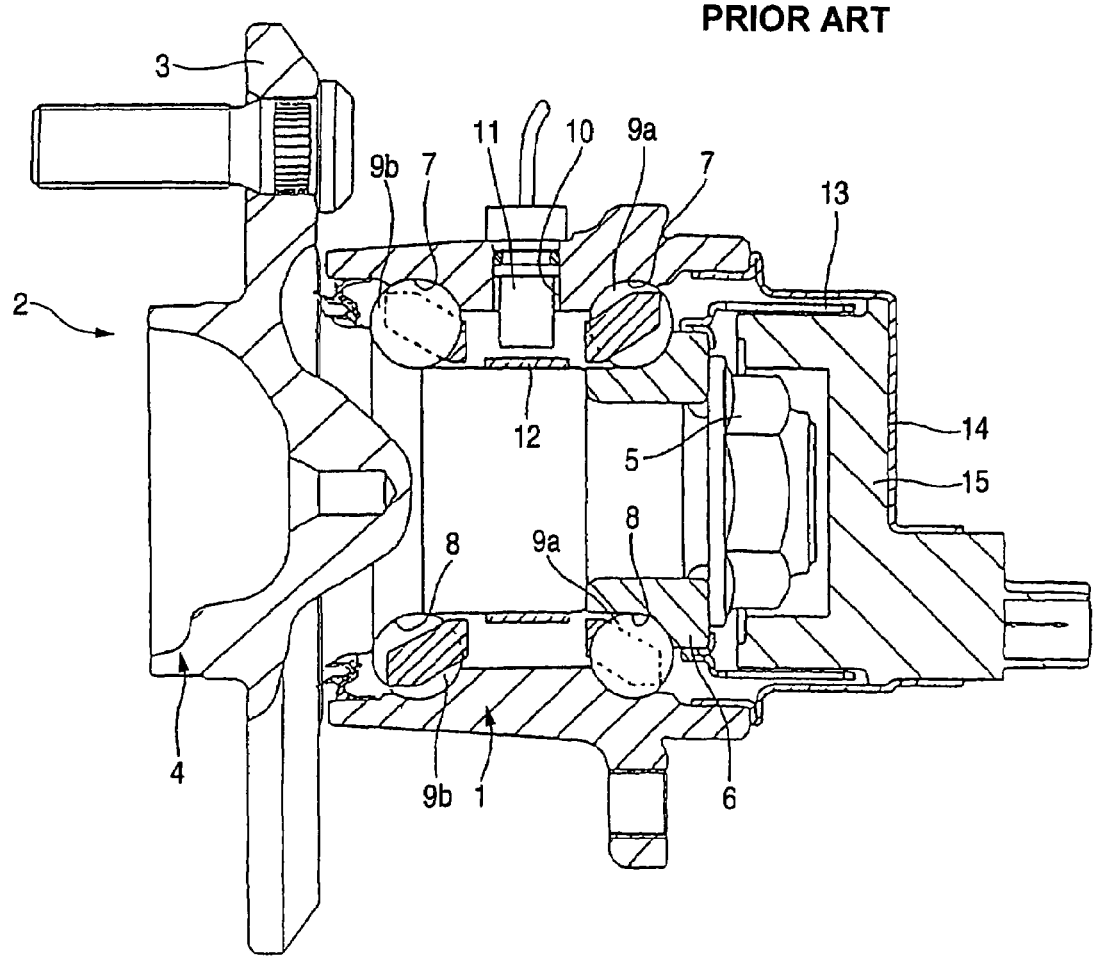
FIG. 17 is a sectional view of a rolling bearing unit equipped with a radial-load measuring sensor, which is known in the related art.
Figure 18:
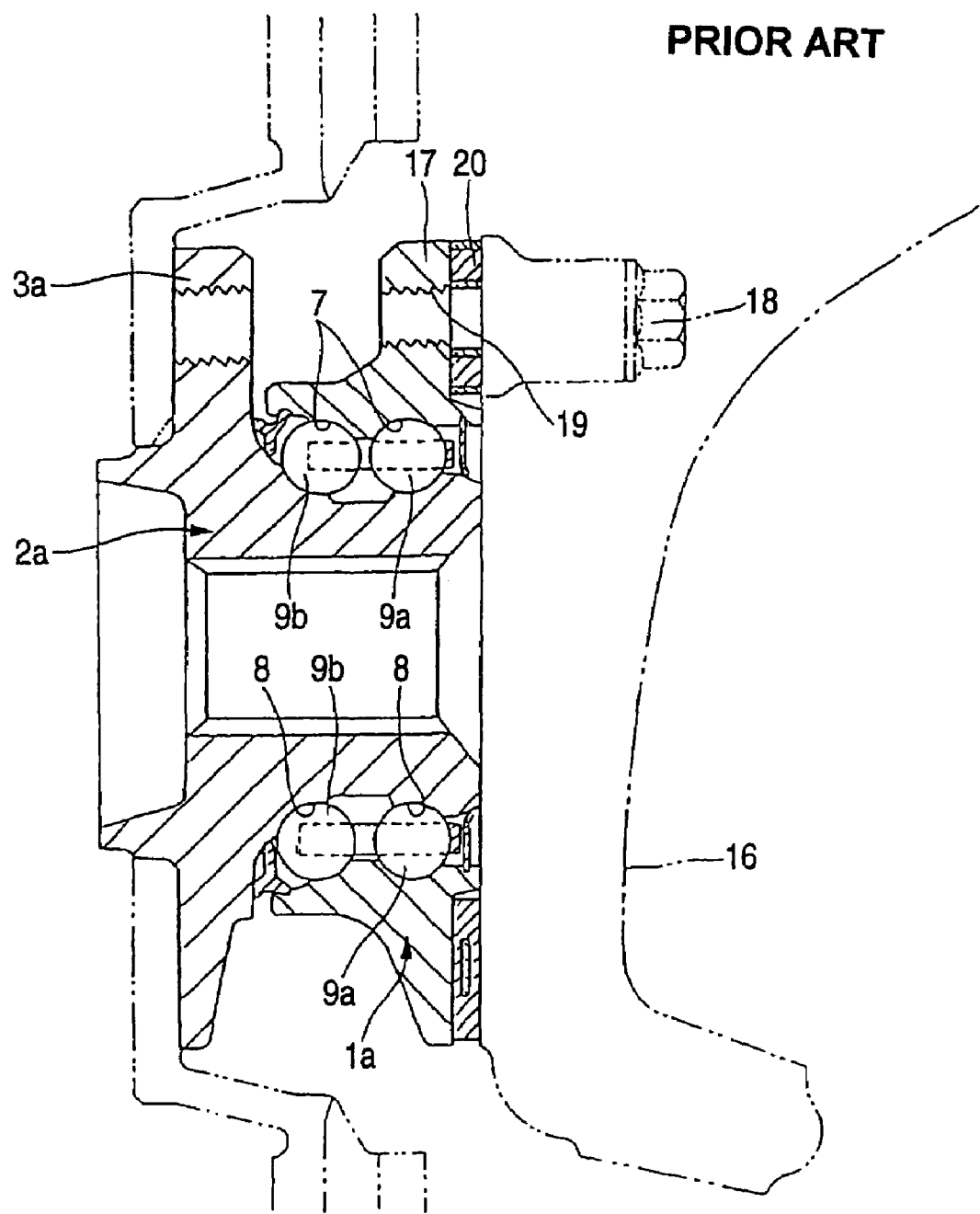
FIG. 18 is a sectional view of a rolling bearing unit equipped with an axial-load measuring sensor, which is known in the related art.

FIGS. 1 to 5 show an embodiment of the present invention. This embodiment shows the case where the present invention is applied to the load measuring unit for the rolling bearing unit used to measure the loads (the radial load and the axial load) applied to the rolling bearing unit that supports the idler wheel (the front wheel of the FR car, the RR car, and the MD car, the rear wheel of the FF car) of the car. Since the configuration and the operation of this rolling bearing unit itself are similar to those of the above related-art structure shown in FIG. 17, duplicate explanations will be omitted or simplified herein by affixing the same reference symbols to the like portions. Therefore, characterizing portions of this embodiment will be explained mainly hereinafter.

The rolling elements (balls) 9*a*, 9*b* are provided rotatably between the double row angular contact inner ring raceways 8, 8 and the double row angular contact outer ring raceways 7, 7 in plural rows (double rows) respectively in a state that plural rolling elements are held every row by cages 21*a*, 21*b* respectively. Such inner ring raceways 8, 8 are formed on the outer peripheral surface of the hub 2, which is the rotating ring and the inner ring equivalent member, and serve as the rotary-side raceway respectively. Such outer ring raceways 7, 7 are formed on the inner peripheral surface of the outer ring 1, which is the stationary ring and the outer ring equivalent member, and serve as the stationary-side raceway respectively. Thus, the hub 2 can be supported rotatably on the inner diameter side of the outer ring 1. The contact angles $\alpha_a$, $\alpha_b$, directed in the opposite direction mutually and having the same magnitude (FIG. 2) are given to the rolling elements 9a, 9b in respective rows in this state, whereby the back-to-back arrangement type double row angular contact ball bearing is constructed. The sufficient preload is applied to the rolling elements 9a, 9b in respective rows to such extent that such preload is in no way lost by the axial load applied in use. Upon using such rolling bearing unit, the braking disk and the wheel of the vehicle are supported/fixed to the rotary-side flange 3 of the hub 2 by supporting/fixing the outer ring 1 to the suspension system.

A fitting hole 10a is formed in the middle portion of the outer ring 1 constituting the above rolling bearing unit between the double row outer ring raceways 7, 7 in the axial direction in a state that such hole passes through the outer ring 1 in the radial direction. Then, a sensor unit 22 is inserted into the fitting hole 10a from the outside of the outer ring 1 in the radial direction to protrude a sensing portion 23, which is provided to the top end portion of the sensor unit 22, from the inner peripheral surface of the outer ring 1. A pair of revolution speed sensors 24a, 24b and a rotational speed sensor 15a are provided to this sensing portion 23.

The revolution speed sensors 24a, 24b are provided to measure the revolution speeds of the rolling elements 9a, 9b arranged in double rows, and respective sensing surfaces are arranged on both side surfaces of the sensing portion 23 in the axial direction (the lateral direction in FIGS. 1 to 2) of the hub 2. In the case of this example, respective revolution speed sensors 24a, 24b sense the revolution speed of the rolling elements 9a, 9b arranged in double rows as the revolution speed of respective cages 21a, 21b. Therefore, in the case of the present example, rim portions 25, 25 constituting these cages 21a, 21b are arranged on the mutually opposing sides. Then, revolution speed encoders 26a, 26b formed like a circular ring respectively are affixed/supported to mutually-opposing faces of these rim portions 25, 25 around the overall circumference. The characteristics of the sensed surfaces of these revolution speed encoders 26a, 26b, which are changed alternately at an equal interval along the circumferential direction, makes it possible for respective revolution speed sensors 24a, 24b to sense the rotational speeds of the cages 21a, 21b.

For this purpose, the sensing surfaces of respective revolution speed sensors 24a, 24b are opposed in the vicinity of the mutually-opposing surfaces as the sensed surfaces of the revolution speed encoders 26a, 26b. In this case, it is preferable that distances (sensed clearances) between the sensed surfaces of respective revolution speed encoders 26a, 26b and the sensing surfaces of respective revolution speed sensors 24a, 24b should be set larger than the pocket clearances as the clearances between inner surfaces of the pockets of the cages 21a, 21b and rolling surfaces of the rolling elements 9a, 9b, but smaller than 2 mm. If the sensed clearances are set to the pocket clearances or less, it is possible that the sensed surfaces and the sensing surfaces are rubbed with each other when the cages 21a, 21b are displaced by this pocket clearance, and thus such situation is not preferable. In contrast, if the sensed clearances are in excess of 2 mm, it becomes difficult to measure precisely the revolutions of respective revolution speed encoders 26a, 26b by respective revolution speed sensors 24a, 24b.

Meanwhile, the rotational speed sensor 15a is provided to measure the rotational speed of the hub 2 as the rotating ring, and its sensing surface is arranged on the top end surface of the sensing portion 23, i.e., the inner end surface of the outer ring 1 in the radial direction. Also, a cylindrical rotational speed encoder 27 is fitted/fixed onto the middle portion of the hub 2 between the double row inner ring raceways 8, 8.

The sensing surface of the rotational speed sensor 15a is faced to the outer peripheral surface as the sensed surface of the rotational speed encoder 27. The characteristic of the sensed surface of the rotational speed encoder 27, which is changed alternately at an equal interval around the circumference, makes it possible for the rotational speed sensor 15a to sense the rotational speed of the hub 2. The sensed clearance between the outer peripheral surface of the rotational speed encoder 27 and the sensing surface of the rotational speed sensor 15a is also suppressed smaller than 2 mm.

In this case, in order to get the control signals for the ABS or the TCS in the related art, encoders having various structures utilized to sense the revolution speed of the wheel can be employed as the encoders 26a, 26b, 27. For example, the encoder made of the multipolar magnet, in which the N pole and the S pole are arranged on the sensed surface (the side surface or the outer peripheral surface) alternately at an equal interval, may be preferably employed as the encoders 26a, 26b, 27. In this case, the encoder made of the simple magnetic material, or the encoder whose optical characteristic is changed alternately at an equal interval in the circumferential direction (if such encoder is combined with the optical revolution speed sensor) can be employed.

In the case of the present example, as the revolution speed encoders 26a, 26b, the circular-ring permanent magnet in which the N pole and the S pole are arranged alternately at an equal interval on the side surface in the axial direction as the sensed surface is employed. Such revolution speed encoders 26a, 26b are coupled/fixed to side surfaces of the rim portions 25, 25 of the cages 21a, 21b prepared separately by means of the adhesives, otherwise such revolution speed encoders 26a, 26b are set in the cavities before the injection molding of the cages 21a, 21b and then coupled/fixed to above side surfaces by means of the insert molding. It may be chosen in answer to a cost, a required coupling strength, etc to employ any method.

Also, as the revolution speed sensors 24a, 24b and the rotational speed sensor 15a all of which are the sensor for sensing the rotational speed, a magnetic rotational speed sensor is desirably employed. Also, as this magnetic rotational speed sensor, the active type rotational speed sensor into which the magnetic sensing element such as the Hall element, the Hall IC, the magnetoresistive element (MR element, GMR element), the MI element, or the like is incorporated is desirably employed. In order to construct such active type rotational speed sensor into which the magnetic sensing element is incorporated, for example, one side surface of this magnetic sensing element is put on one end surface of the permanent magnet in the magnetizing direction directly or via the stator formed of magnetic material (in the case where the encoder formed of magnetic material is used) and then the other side surface of this magnetic sensing element is opposed to the sensed surfaces of the encoders 26a, 26b, 27 directly or via the stator formed of magnetic material respectively. In the case of the present example, the permanent magnet on the sensor side is not needed since the encoder formed of the permanent magnet is used.

In the case of the load measuring unit for the rolling bearing unit in the present embodiment, sensed signals of the sensors 24a, 24b, 15a are input into a not-shown calculator. Then, this calculator calculates one or both of the radial load and the axial load applied between the outer ring 1 and the hub 2, based on the sensed signals fed from these sensors 24a, 24b, 15a. For example, when the radial load is to be calculated, the calculator calculates a sum (or product) of the revolution speeds of the rolling elements 9a, 9b in respective rows, which are sensed by the revolution speed sensors 24a, 24b, and then calculates the radial load based on a ratio of this sum (or product) to the rotational speed (or square of the rotational speed) of the hub 2, which is sensed by the rotational speed sensor 15a. Also, when the axial load is to be calculated, the calculator calculates a difference between the revolution speeds of the rolling elements 9a, 9b in respective rows, which are sensed by the revolution speed sensors 24a, 24b, and then calculates the axial load based on a ratio of this difference to the rotational speed of the hub 2, which is sensed by the rotational speed sensor 15a.

In particular, in the case of the present embodiment, the influence of a displacement of the radial load $F_z$ or the axial load $F_y$ applied between the outer ring 1 and the hub 2 upon a relationship between variations of these loads $F_z$, $F_y$ and an amount of change in the revolution speeds $\epsilon$ of the rolling elements 9a, 9b in respective rows can be reduced by employing one or both of following approaches (a)(b).

(a) The contact angles $\alpha_a$, $\alpha_b$ of the rolling elements 9a, 9b in respective rows are differentiated mutually.

(b) The relational expression representing a relationship between the variations of these loads $F_z$, $F_y$ and an amount of change in the revolution speeds $\epsilon$ of the rolling elements 9a, 9b in respective rows based on the displacement of the radial load $F_z$ or the axial load $F_y$ applied between the outer ring 1 and the hub 2 is incorporated (a software into which the expression is incorporated is installed into a microcomputer), and then respective loads $F_z$, $F_y$ are calculated based on this expression.

The reason why one or both of above approaches (a)(b) is employed to reduce the influence of the displacement of the load $F_z$, $F_y$ applied between the outer ring 1 and the hub 2 upon a relationship between variations of these loads $F_z$, $F_y$ and an amount of change in the revolution speeds $\epsilon$ of the rolling elements 9a, 9b in respective rows will be discussed with reference to FIGS. 4 to 12 hereinafter. At first, the situation that the contact angles $\alpha_a$, $\alpha_b$ of the rolling elements 9a, 9b in respective rows are identical to each other and also the radial load $F_z$ is applied to the center position between the rolling elements 9a, 9b in respective rows in the axial direction and the axial load $F_y$ is applied to the center axis (center portion) of the hub 2, as shown in FIG. 4, i.e., the case where no displacement of these loads $F_z$, $F_y$ is exists will be explained hereunder.

Figure 1:
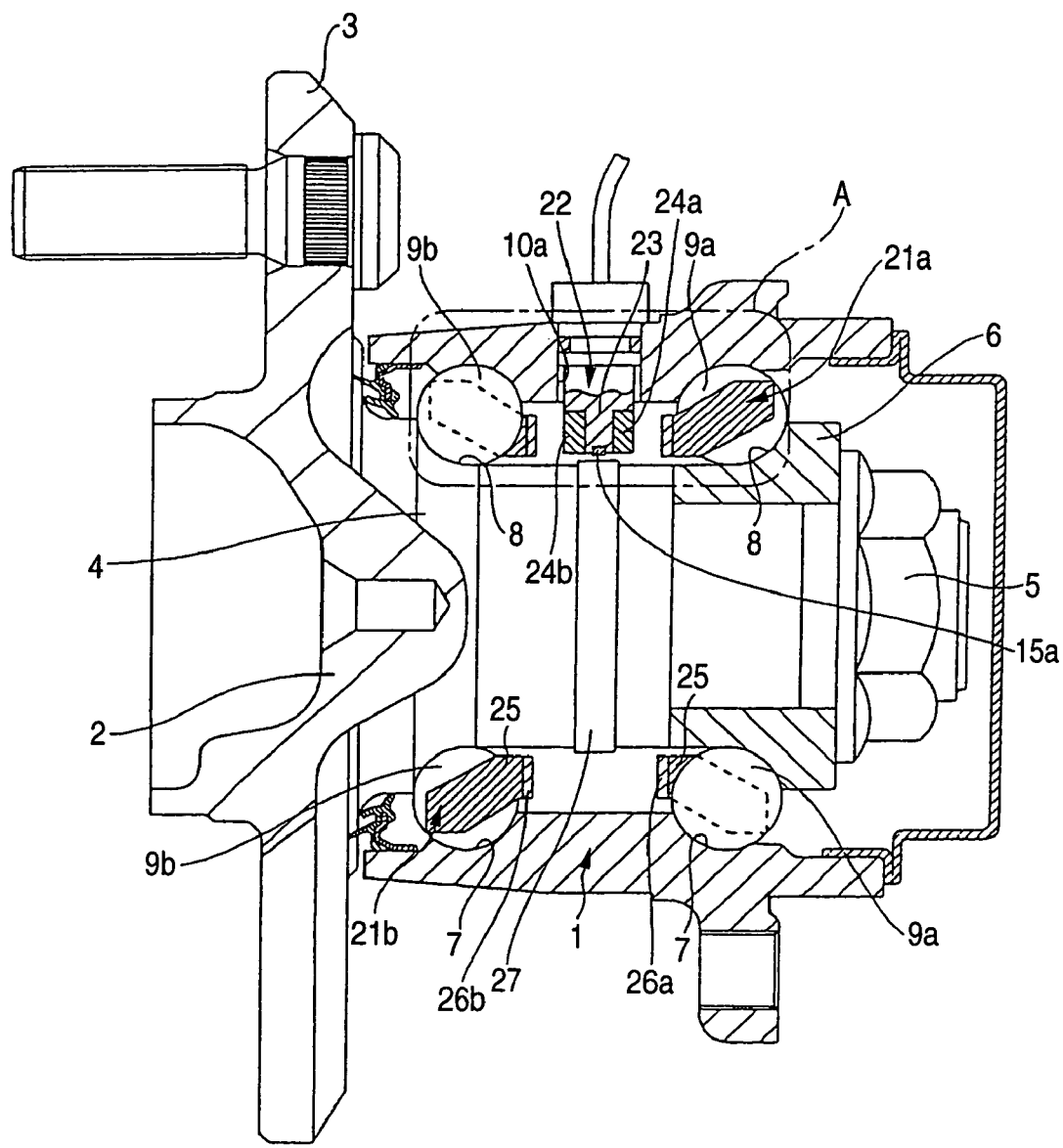
FIG. 1 is a sectional view of a rolling bearing unit equipped with a load-measuring revolution speed sensor, which shows an embodiment of the present invention.
Figure 2:
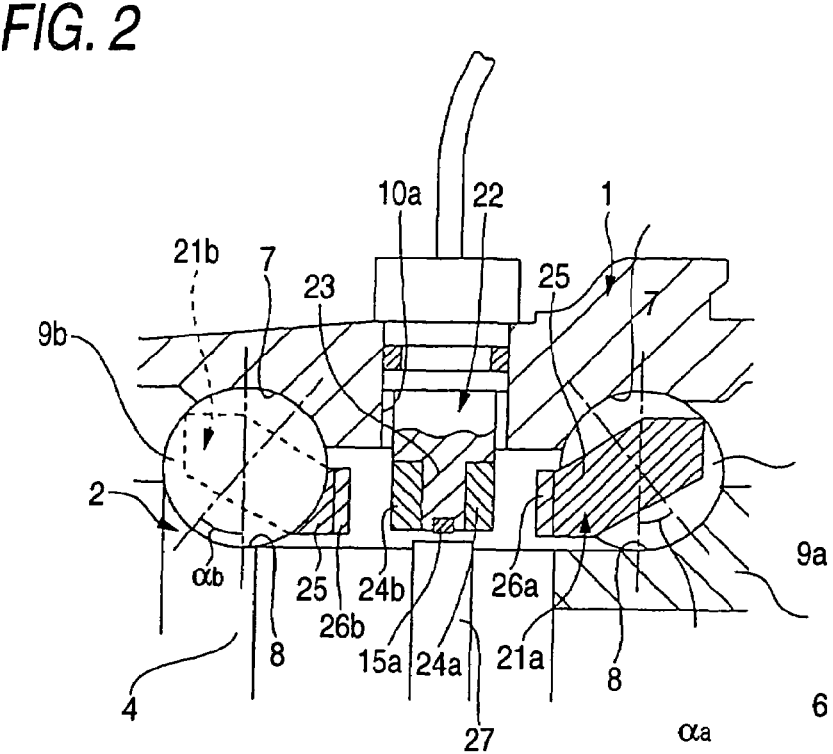
FIG. 2 is an enlarged view of an A part in FIG. 1.
Figure 3:
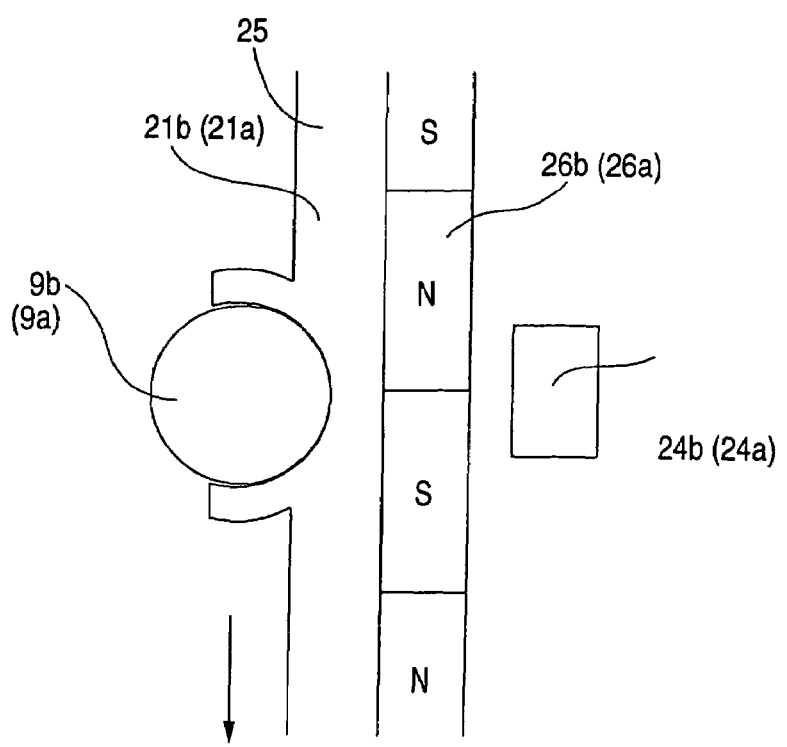
FIG. 3 is a schematic view showing a cage and a rolling element, an encoder, and a revolution speed sensor, when viewed from the upper side in FIG. 2.
Figure 4:
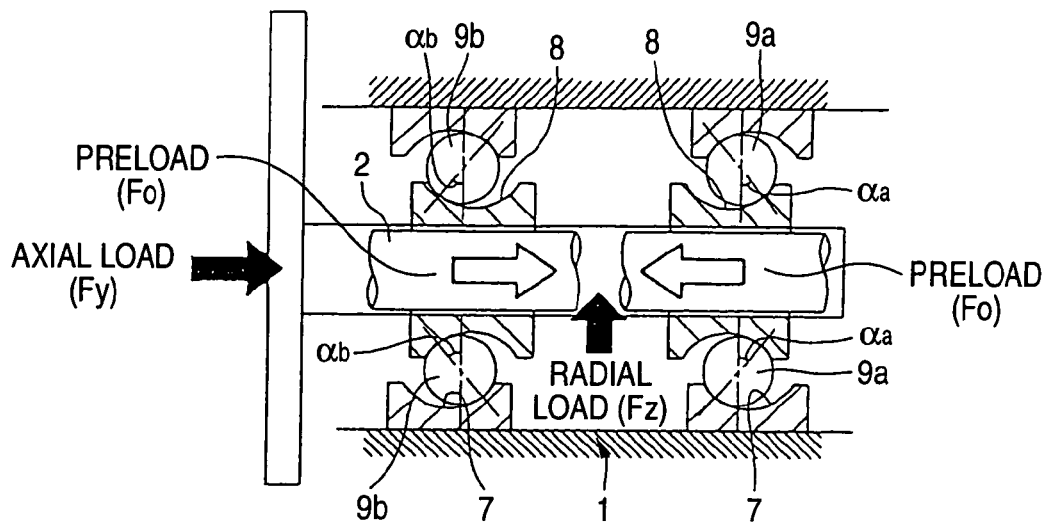
FIG. 4 is a schematic view of a rolling bearing unit used to explain the reason why a load can be measured based on a revolution speed.

FIG. 4 shows schematically the state that respective loads act on the rolling bearing unit for supporting the wheel shown in above FIG. 1. The preloads $F_o$, $F_o$ are applied to the rolling elements 9a, 9b arranged in double rows between the double row inner ring raceways 8, 8 and the double row outer ring raceways 7, 7. Also, the radial load $F_z$ is applied to the rolling bearing unit by the weight of the car body, etc. in use. In addition, the axial load $F_y$ is applied by a centrifugal force applied during the turning, etc. All the preloads $F_o$, $F_o$, the radial load $F_z$, and the axial load $F_y$ have an influence upon the contact angles $\alpha(\alpha_a, \alpha_b)$ of the rolling elements 9a, 9b. Then, the revolution speeds $\epsilon$ of these rolling elements 9a, 9b are changed whenever the contact angles $\alpha_a$, $\alpha_b$ are changed. Each of the revolution speeds $\epsilon$ is given by $$\epsilon = \{1 - (d \cdot \cos \alpha/D) \cdot (n_i/2)\} + \{1 + (d \cdot \cos \alpha/D) \cdot (n_o/2)\} \quad (1)$$

where D is a pitch circle diameter of the rolling elements 9a, 9b, d is a diameter of the rolling elements 9a, 9b, $n_i$ is the rotational speed of the hub 2 to which the inner ring raceways 8, 8 are provided, and $n_o$ is the rotational speed of the outer ring 1 to which the outer ring raceways 7, 7 are provided.

As apparent from this Eq. (1), the revolution speeds $\epsilon(\epsilon_a, \epsilon_b)$ of the rolling elements 9a, 9b are changed according to change in the contact angles $\alpha(\alpha_a, \alpha_b)$ of the rolling elements 9a, 9b. In this case, as described above, the contact angles $\alpha_a$, $\alpha_b$ are changed according to the radial load $F_z$ and the axial load $F_y$. As a result, the revolution speeds $\epsilon$ are changed according to the radial load $F_z$ and the axial load $F_y$. For example, when the axial load $F_y$ is applied to the center axis of the hub 2 under the assumption that the radial load $F_z$ is constant, the revolution speed $\epsilon_b$ in the row to support the axial load $F_y$ is increased, as indicated by a broken line b in FIG. 5, as the axial load $F_y$ is increased. In contrast, the revolution speed $\epsilon_a$ in the row not to support the axial load $F_y$ is decreased, as indicated by a solid line a in FIG. 5, as the axial load $F_y$ is increased. Also, the revolution speeds $\epsilon_a$, $\epsilon_b$ in respective rows are similarly decreased, as shown in FIG. 6, as the radial load $F_z$ is increased. Consequently the radial load $F_z$ and the axial load $F_y$ can be obtained with good precision by executing merely a simple addition and subtraction and a simple calculation to derive a ratio to the rotational speed $n_i$ of the hub 2 based on the revolution speeds $\epsilon_a$, $\epsilon_b$.

However, the contact angles $\alpha$ that are related with the change in the revolution speeds $\epsilon_a$, $\epsilon_b$ are changed based on not only the mutual relationship between the radial load $F_z$ and the axial load $F_y$ but also the preloads $F_o$, $F_o$. Also, the revolution speeds $\epsilon$ are changed in proportion to the rotational speed $n_i$ of the hub 2. For this reason, the revolution speeds $\epsilon$ cannot be precisely derived unless all the radial load $F_z$, the axial load $F_y$, the preloads $F_o$, $F_o$, and the rotational speed $n_i$ of the hub 2 are considered while correlating with each other. Since the preloads $F_o$, $F_o$ out of them are not changed dependent on the driving condition, it is easy to exclude the influence by initialization, or the like. On the contrary, since the radial load $F_z$, the axial load $F_y$, and the rotational speed $n_i$ of the hub 2 are changed constantly dependent on the driving condition, it is impossible to exclude the influence by initialization, or the like.

Therefore, in the case where the radial load $F_z$ is derived, the influence of the axial load $F_y$ can be suppressed small by calculating a sum $(\epsilon_a + \epsilon_b)$ (or product) of the revolution speeds of the rolling elements 9a, 9b in respective rows, which are sensed by the revolution speed sensors 24a, 24b. Also, in the case where the axial load $F_y$ is derived, the influence of the radial load $F_z$ can be suppressed small by calculating a difference $(\epsilon_b - \epsilon_a)$ between the revolution speeds of the rolling elements 9a, 9b in respective rows. In addition, in any case, the influence of the rotational speed $n_i$ of the hub 2 can be excluded by calculating the radial load $F_z$ or the axial load $F_y$ based on a ratio of the sum or difference to the rotational speed $n_i$ of the hub 2, which is sensed by the rotational speed sensor 15a.

Here, the method of calculating one or both of the radial load $F_z$ and the axial load $F_y$ based on the signals output from the revolution speed sensors 24a, 24b are present variously in addition to the above. Since such method is not associated with the gist of the present invention, their detailed explanation will be omitted herein.

In this case, even though any load should be calculated by any method, such a condition is needed to calculate precisely the axial load $F_y$ that an extent $\Delta\epsilon_b$ to which the revolution speed $\epsilon_b$ in the row that supports the axial load $F_y$ is changed based on the variation of the axial load $F_y$ becomes mutually equal to an extent $\Delta\epsilon_a$ to which the revolution speed $\epsilon_a$ in the row that does not support the axial load $F_y$ is changed $(|\Delta\epsilon_b| \approx |\Delta\epsilon_a|)$. Also, such a condition is needed to calculate precisely the radial load $F_z$ that the revolution speeds $\epsilon_b$, $\epsilon_a$ in respective rows are changed similarly according to the variation of the radial load $F_z$.

As shown in FIG. 4, the above conditions are satisfied when no displacement exists in these loads $F_z$, $F_y$, nevertheless errors of calculated values of these loads $F_z$, $F_y$ are increased if the calculations are executed as they are when the acting direction of one or both of these loads $F_z$, $F_y$ is displaced.

Figure 7:
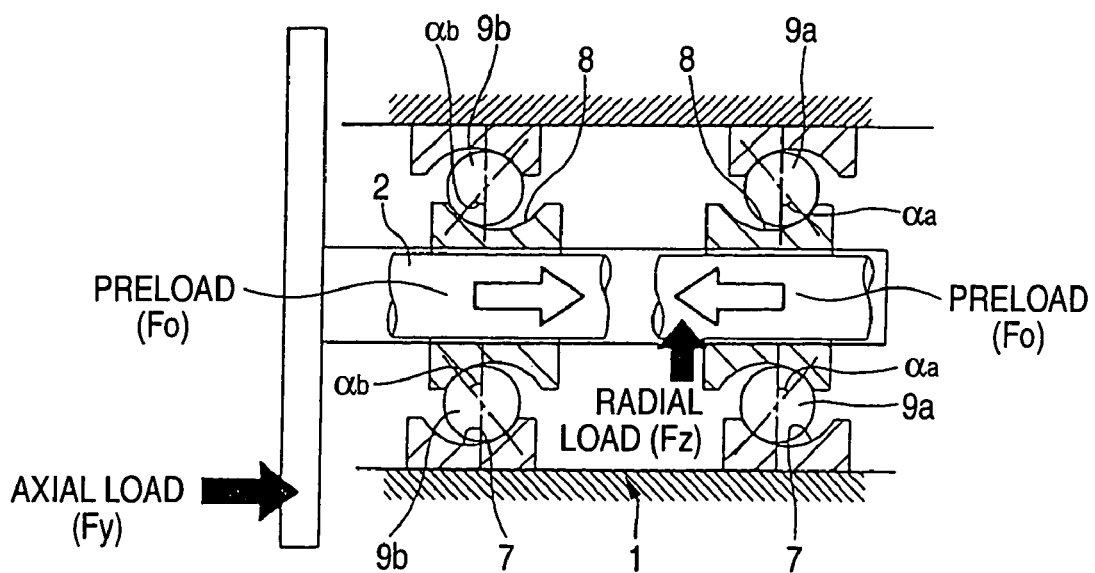
FIG. 7 is a view showing a state that a displacement exists in an acting direction of the axial load, which is similar to FIG. 4.

For example, as shown in FIG. 7, the case where the radial load $F_z$ is applied to the position that is out of the center position and its vicinity between both rows of the rolling elements 9a, 9b and also the axial load $F_y$ is applied to the position that is out of the center portion of the hub 2 in the rolling bearing unit is considered. For example, for convenience of design of the suspension system, sometimes it is impossible to position the acting direction of the radial load $F_z$ in the center portion and its vicinity of both rows of the rolling elements 9a, 9b in the rolling bearing unit for supporting the wheel. Also, the axial load $F_y$ applied to the rolling bearing unit for supporting the wheel during the turning of the car is input from the contact surface of the tire (the contact portion between the tire and the road surface). Therefore, the state shown in FIG. 7 is caused ordinarily even though the rolling bearing unit is ideally assembled into the suspension system. In such state, a moment is applied to the hub 2 of the rolling bearing unit based on respective loads $F_z$, $F_y$.

Figure 8:
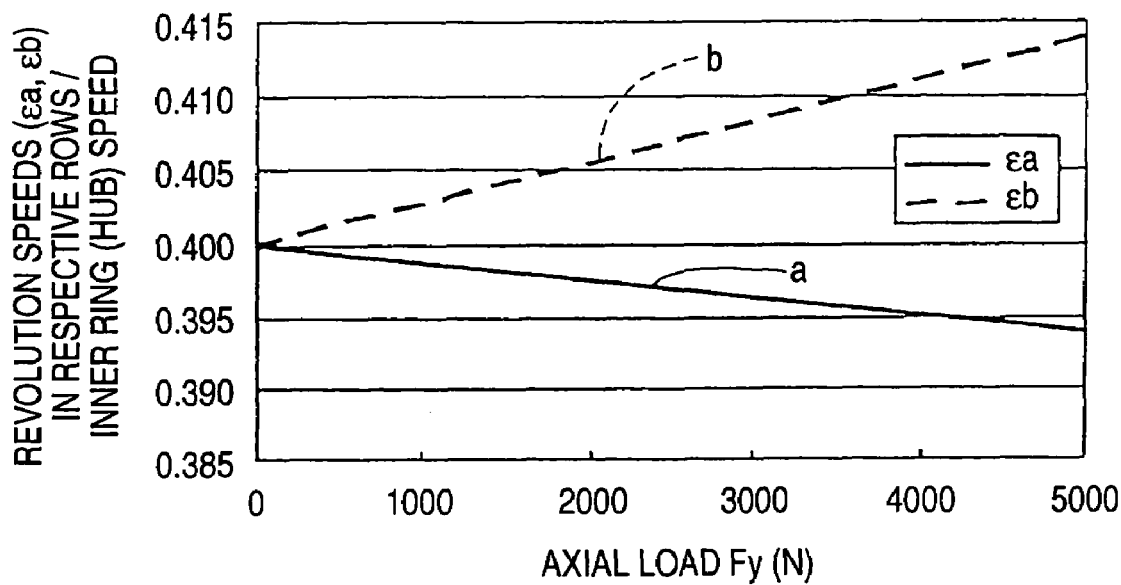
FIG. 8 is a diagram showing relationships between the axial load and the revolution speeds of the rolling elements in respective rows in a state shown in FIG. 7.
Figure 9:
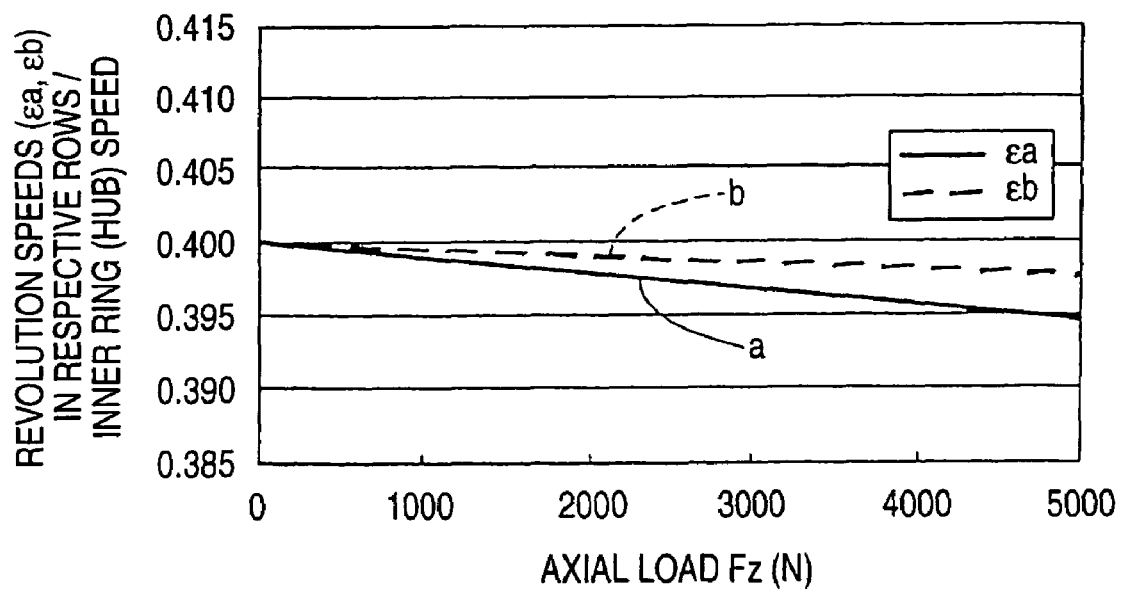
FIG. 9 is a diagram showing relationships between the radial load and the revolution speeds of the rolling elements in respective rows in the similar state.

In such case, as shown in FIGS. 8, 9, the revolution speeds $\epsilon_a$, $\epsilon_b$ of the rolling elements 9a, 9b in respective rows are changed according to the variations of respective loads $F_z$, $F_y$. First, in the case where the axial load $F_y$ is varied while maintaining the radial load $F_z$ constant, the revolution speed $\epsilon_b$ in the row that supports the axial load $F_y$ is increased and also the revolution speed $\epsilon_a$ in the row that does not support the axial load $F_y$ is decreased, as indicated by a broken line b and a solid line a shown in FIG. 8, when the axial load $F_y$ is increased. This tendency is similar to the case where no displacement exists in respective loads $F_z$, $F_y$, but the extend to which the revolution speeds $\epsilon_a$, $\epsilon_b$ of the rolling elements 9a, 9b in respective rows are changed is different between the rolling elements 9a, 9b in respective rows (inclination absolute values are different between the broken line b and the solid line a in FIG. 8). In such case, the error is extended even if it is tried to calculate the axial load $F_y$ from the revolution speeds of the rolling elements 9a, 9b in respective rows by using the simple calculation.

Also, as indicated by a broken line b and a solid line a shown in FIG. 9, the revolution speeds $\epsilon_a$, $\epsilon_b$ in respective rows are decreased as the radial load $F_z$ is increased, but the decreasing extent is different. In such case, the error is extended even if it is tried to calculate the radial load $F_z$ from the revolution speeds of the rolling elements 9a, 9b in respective rows by using the simple calculation.

Figure 10:
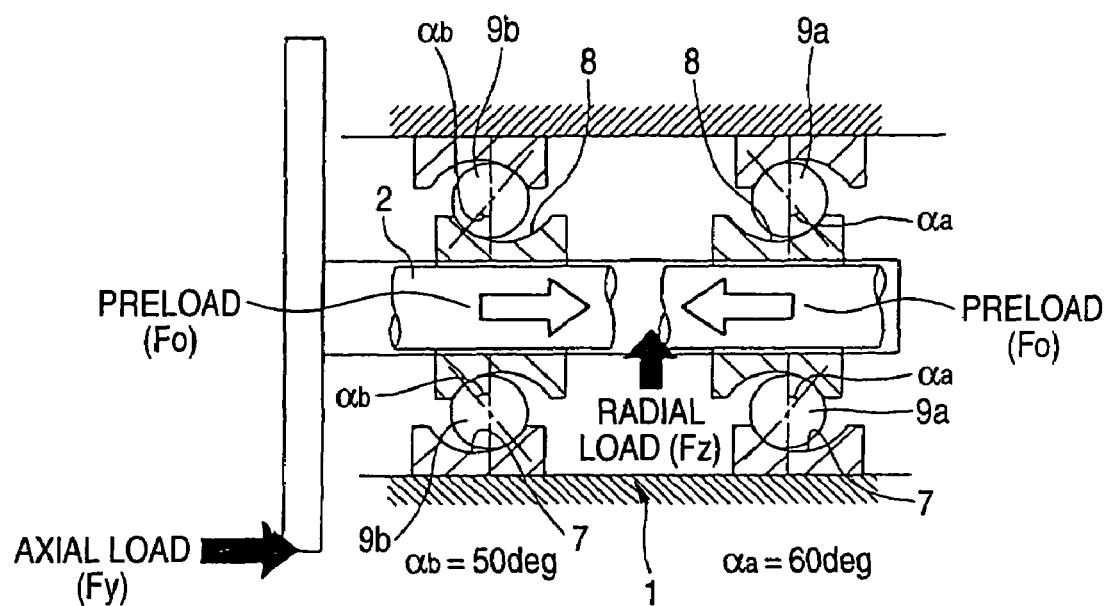
FIG. 10 is a view showing a structure in which contact angles of the rolling elements in respective rows are mutually differentiated in a state that a displacement exists in respective acting directions of the axial load and the radial load, which is similar to FIG. 4.

In contrast, even when the acting direction of one or both of the loads $F_z$, $F_y$ is displaced, it is possible not to generate a large difference between levels of the change in the revolution speeds $\epsilon_a$, $\epsilon_b$ in respective rows caused due to variations of these loads $F_z$, $F_y$ if the contact angles $\alpha_a$, $\alpha_b$ of the rolling elements 9a, 9b in respective rows are differentiated mutually, as indicated by the above approach (a). For example, as shown in FIG. 10, the case where the radial load $F_z$ is applied to the center position and its vicinity between the rolling elements 9a, 9b in double rows and the axial load $F_y$ is applied to the position that is out of the center portion of the rolling bearing unit will be discussed hereunder. In this case, the relationships between the loads $F_z$, $F_y$ and the revolution speeds $\epsilon_a$, $\epsilon_b$ of the rolling elements 9a, 9b in respective rows show a tendency similar to those in FIGS. 8, 9 if the contact angles $\alpha_a$, $\alpha_b$ of the rolling elements 9a, 9b in double rows are set equally to each other. As a result, it is impossible to derive exactly the loads $F_z$, $F_y$ by the simple calculation.

Figure 11:
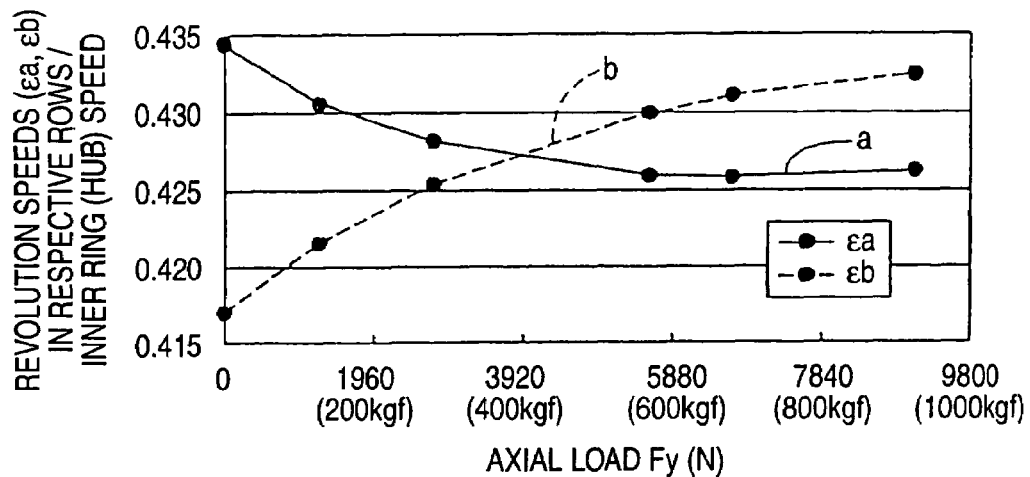
FIG. 11 is a diagram showing relationships between the axial load and the revolution speeds of the rolling elements in respective rows in the state and the structure shown in FIG. 10.
Figure 12:
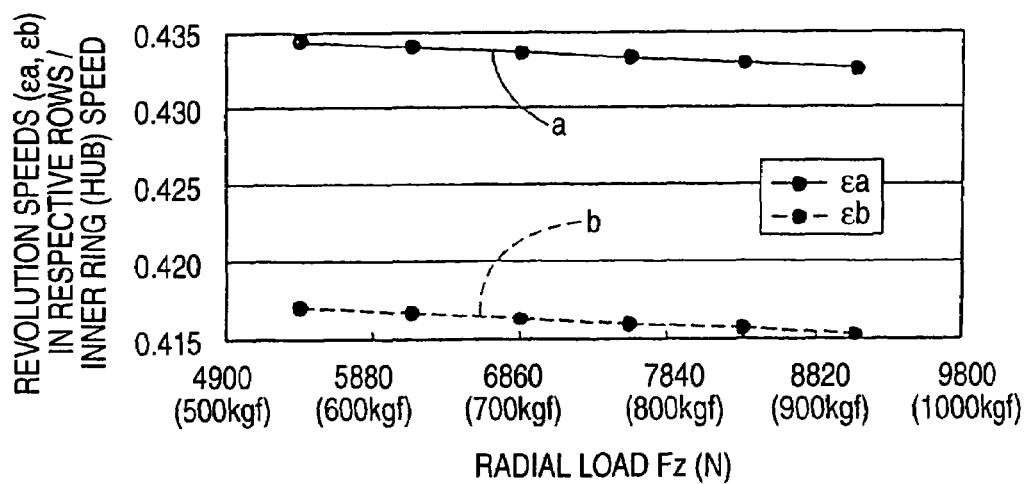
FIG. 12 is a diagram showing relationships between the radial load and the revolution speeds of the rolling elements in respective rows in the similar condition.

In contrast, FIGS. 11 and 12 shows results of the relationships between the loads $F_z$, $F_y$ and the revolution speeds $\epsilon_a$, $\epsilon_b$ of the rolling elements 9a, 9b in respective rows, which were derived by the computer simulation, in the case where the contact angle $\alpha_b$ of the rolling elements 9a, 9b in the row that supports the axial load $F_y$ is set to 50 degree and the contact angle $\alpha_a$ of the rolling elements 9a, 9b in the row that does not support the same is set to 60 degree.

First, in the case where the axial load $F_y$ is varied while keeping the radial load $F_z$ constant, the revolution speed $\epsilon_b$ in the row that supports the axial load $F_y$ is increased but the revolution speed $\epsilon_a$ in the row that does not support the axial load $F_y$ is decreased, as indicated by a broken line b and a solid line a in FIG. 11, when the axial load $F_y$ is increased. Then, the extents to which the revolution speeds $\epsilon_a/\epsilon_b$ of the rolling elements 9a, 9b in respective rows are changed are never largely differentiated between the rolling elements 9a, 9b in respective rows (absolute values of the inclination become almost equal between the broken line b and the solid line a shown in FIG. 11) inasmuch as the axial load $F_y$ is not extremely increased {does not exceed 6860 N (700 ksf)}.

Also, in the case where the radial load $F_z$ is changed while not applying the axial load $F_y$, the revolution speeds $\epsilon_a$, $\epsilon_b$ of the rolling elements 9a, 9b in respective rows are decreased, as indicated by a broken line b and a solid line a in FIG. 12, when the radial load $F_z$ is increased. Since the contact angles $\epsilon_a$, $\epsilon_b$ of the rolling elements 9a, 9b in respective rows are different mutually, absolute values of the revolution speeds $\epsilon_a$, $\epsilon_b$ of the rolling elements 9a, 9b in respective rows are different mutually, but the tendency of change and the extent of change are equal to each other.

In this manner, even though a displacement of the acting direction of the axial load $F_y$ exists, the revolution speeds $\epsilon_a$, $\epsilon_b$ of the rolling elements 9a, 9b in respective rows can be changed similarly by differentiating the contact angles $\alpha_a$, $\alpha_b$ of the rolling elements 9a, 9b in respective rows mutually. Then, the loads $F_y$, $F_z$ can be calculated with required precision based on the revolution speeds $\epsilon_a$, $\epsilon_b$ of the rolling elements 9a, 9b in respective rows by the simple calculation.

Above respects will be explained by using mathematical expressions hereunder.

In the case where the axial load $F_y$ and the radial load $F_z$ are applied to the rolling bearing units shown in FIGS. 4, 7, 10, the revolution speeds $\epsilon_a$, $\epsilon_b$ of the rolling elements 9a, 9b in respective rows can be represented by following Eqs. (2)(3) if influence coefficients $k_{ya}$, $k_{yb}$, $k_{za}$, $k_{zb}$ are employed.

$$\epsilon_a = k_{ya} \cdot F_y + k_{za} \cdot F_z \quad (2)$$

$$\epsilon_b = k_{yb} \cdot F_y + k_{zb} \cdot F_z \quad (3)$$

Inclinations of the broken line b and the solid line a shown in above FIGS. 5, 6, 8, 9, 11, 12 yield respective influence coefficients $k_{ya}$, $k_{yb}$, $k_{za}$, $k_{zb}$.

Figure 5:
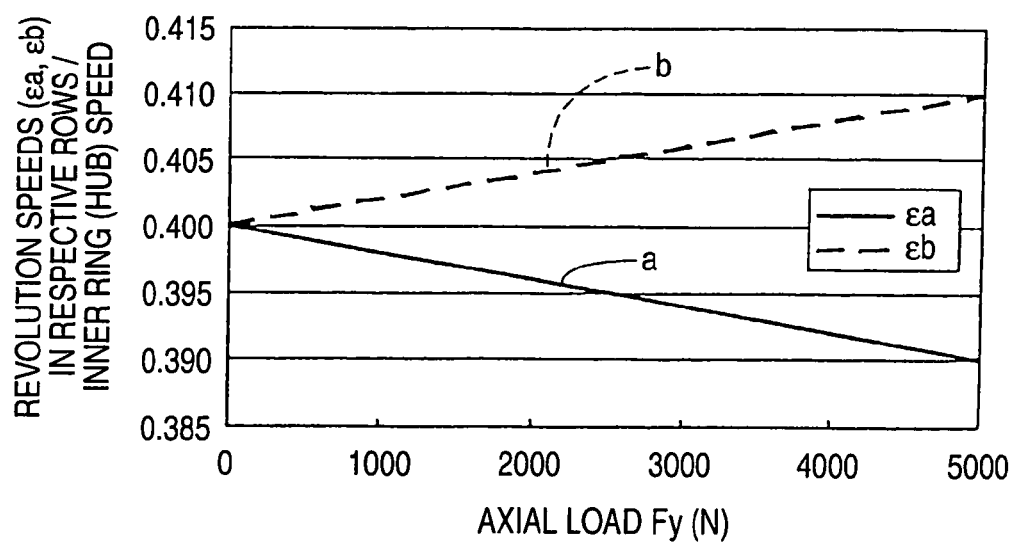
FIG. 5 is a diagram showing relationships between an axial load and revolution speeds of rolling elements in respective rows.
Figure 6:
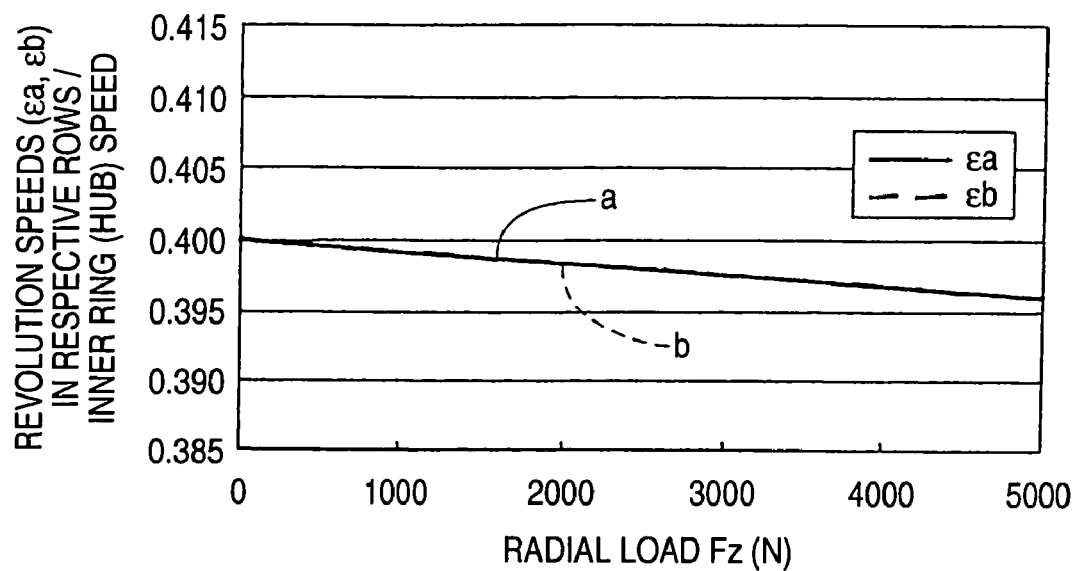
FIG. 6 is a diagram showing relationships between a radial load and revolution speeds of rolling elements in respective rows.

In the case where the acting directions of the loads $F_y$, $F_z$ are not displaced, as shown in FIG. 4, and the absolute values of the inclinations of the broken line b and the solid line a are equal mutually, as shown in FIGS. 5, 6, i.e. $k_{ya} = -k_{yb}$ and $k_{za} = k_{zb}$, substituting these relationships into above Eq. (2) gives $$\epsilon_a = -k_{yb} \cdot F_y + k_{zb} \cdot F_z \quad (4)$$

$$\epsilon_b = k_{yb} \cdot F_y + k_{zb} \cdot F_z \quad (3)$$

In addition, adding/subtracting (±) and arranging the revolution speeds ϵa, ϵb of the rolling elements 9a, 9b in respective rows, as given by these Eqs. (3) (4), give $$\epsilon_b - \epsilon_a = 2k_{yb} \cdot F_y \Rightarrow F_y = (\epsilon_b - \epsilon_a)/2k_{yb} \quad (5)$$

$$\epsilon_b + \epsilon_a = 2k_{zb} \cdot F_z \Rightarrow F_z = (\epsilon_b + \epsilon_a)/2k_{zb} \quad (6)$$

As apparent from these Eqs. (5) (6), the loads $F_y$, $F_z$ can be derived exactly by the foregoing prior inventions (patent application Nos. 2003-171715 and 172483) unless the acting directions of the loads $F_y$, $F_z$ are not displaced.

On the contrary, the relationships of "$k_{ya} = -k_{yb}$" and "$k_{za} = k_{zb}$" are not satisfied and therefore above Eqs. (5) (6) are not satisfied if the acting directions of the loads $F_y$, $F_z$ are displaced, as shown in FIGS. 7, 10. In contrast, the relationships of "$k_{ya} = -k_{yb}$" and "$k_{za} = k_{zb}$" can be satisfied by differentiating appropriately the contact angles $\alpha_a$, $\alpha_b$ of the rolling elements 9a, 9b in respective rows mutually, as explained in above FIG. 10, even though the acting directions of the loads $F_y$, $F_z$ are displaced. For example, in the case where the contact angle $\epsilon_b$ of the rolling elements 9a, 9b in the row that supports the axial load $F_y$ is set to 50 degree and the contact angle $\epsilon_a$ of the rolling elements 9a, 9b in the row that does not support the same is set to 60 degree, as described above, the revolution speeds $\epsilon_a$, $\epsilon_b$ of the rolling elements 9a, 9b in respective rows become different mutually when the axial load $F_y$ is zero because the initial contact angles $\epsilon_a$, $\epsilon_b$ are different mutually, nevertheless the changing characteristics of the revolution speeds $\epsilon_a$, $\epsilon_b$ (gain characteristics) become almost equal mutually in respective rows when the axial load $F_y$ is applied. As a result, the relationships between the influence coefficients required when the loads $F_y$, $F_z$ are derived by the simple addition/subtraction, i.e., the relationships of "$k_{ya} = -k_{yb}$" and "$k_{za} = k_{zb}$" can be satisfied.

In this case, the axial load $F_y$ cannot be calculated if the broken line b and the solid line a intersect with each other in the measured range of the axial load $F_y$, as shown in FIG. 11. Therefore, in the case where the intersection as shown in FIG. 11 occurs at the employed contact angles $\alpha_a$, $\alpha_b$, a process of translating any line is carried out. For example, in the case shown in FIG. 11, operations of deriving the revolution speed $\epsilon_a$ of the rolling elements 9a, 9b in the row that does not support the axial load $F_y$ and then subtracting or adding a predetermined value from or to the revolution speed $\epsilon_a$ (the solid line a in FIG. 11 is translated downward or upward in FIG. 11 up to the position at which such solid line a does not intersect with the broken line b) must be executed.

In the above description, the case where the displacement of the acting direction of the axial load $F_y$ exists is mainly explained. Since the event that the displacement of the acting direction of the axial load $F_y$ exists is inevitable for the rolling bearing unit used to support the wheel of the car, the countermeasure to this displacement becomes particularly important.

In contrast, the displacement of the acting direction of the radial load $F_z$ can be eliminated by the design of the suspension system. Even in the case where the displacement of the acting direction of the radial load $F_z$ exists, the influence can be reduced by differentiating appropriately the contact angles $\alpha_a$, $\alpha_b$ of the rolling elements 9a, 9b in respective rows mutually and thus the loads $F_y$, $F_z$ can be derived precisely, like the case where the displacement of the acting direction of the axial load $F_y$ exists.

Also, the process of calculating exactly the loads $F_y$, $F_z$ irrespective of the displacement of the acting direction of these loads $F_y$, $F_z$ can be handled by the software that is installed into the calculator (microcomputer) portion used to calculate these loads $F_y$, $F_z$ as indicated by the above approach (b). In this case, the expression representing the relationships between variations in the loads $F_y$, $F_z$ and an amount of change in the revolution speeds E of the rolling elements 9a, 9b in respective rows based on the displacement of the radial load $F_z$ and the axial load $F_y$ applied between the outer ring 1 and the hub 2 is installed into the software. Then, respective loads $F_y$, $F_z$ are calculated based on this expression. Therefore, deduction of this expression will be explained hereunder.

The fact that respective loads $F_y$, $F_z$ can be derived exactly by above Eqs. (5) (6) unless the acting directions of the loads $F_y$, $F_z$ are displaced and also the fact that the relationships between "$k_{ya} = -k_{yb}$" and "$k_{za} = k_{zb}$" cannot be satisfied and therefore above Eqs. (5)(6) cannot be satisfied if the acting directions of the loads $F_y$, $F_z$ are displaced are described as above. By the way, two unknowns $F_y$, $F_z$ are present in the influence coefficient equations shown as Eqs. (2) (3) in the following whereas two equations are present, and as a result these unknowns $F_y$, $F_z$ can be analytically solved.

$$\epsilon_a = k_{ya} \cdot F_y + k_{za} \cdot F_z \quad (2)$$

$$\epsilon_b = k_{yb} \cdot F_y + k_{zb} \cdot F_z \quad (3)$$

This signifies that the unknowns $F_y$, $F_z$ can be basically analytically solved in the case where the influence coefficient equations are represented by the polynominal of the axial load $F_y$ and the radial load $F_z$ or the case where the alternating action ($F_y \times F_z$) is contained. As one example, solving above Eqs. (2) (3) in which the influence coefficient equations are represented by the linear equation of these loads $F_y$, $F_z$ give $$F_y = (k_{zb} \cdot \epsilon_a - k_{za} \cdot \epsilon_b)/(k_{ya} \cdot k_{zb} - k_{za} \cdot k_{yb}) \quad (7)$$

$$F_z = -(k_{yb} \cdot \epsilon_a - k_{ya} \cdot \epsilon_b)/(k_{ya} \cdot k_{zb} - k_{za} \cdot k_{yb}) \quad (8)$$

As appreciated from these Eqs. (7)(8), the axial load $F_y$ and the radial load $F_z$ can be calculated solely (separately) by sensing the revolution speeds $\epsilon_a$, $\epsilon_b$ of the rolling elements 9a, 9b in respective rows if respective influence coefficients $k_{ya}$, $k_{yb}$, $k_{za}$, $k_{zb}$ are grasped previously in design or in the experiment made by the computer simulation, or the like.

As described above, if above Eqs. (7) (8) including respective influence coefficients $k_{ya}$, $k_{yb}$, $k_{za}$, $k_{zb}$ derived in advance are installed into the calculator that is used to calculate the axial load $F_y$ and the radial load $F_z$, the mutual influence between the loads $F_y$, $F_z$ can be excluded completely and thus these loads $F_y$, $F_z$ can be precisely calculated independently.

Figure 13:
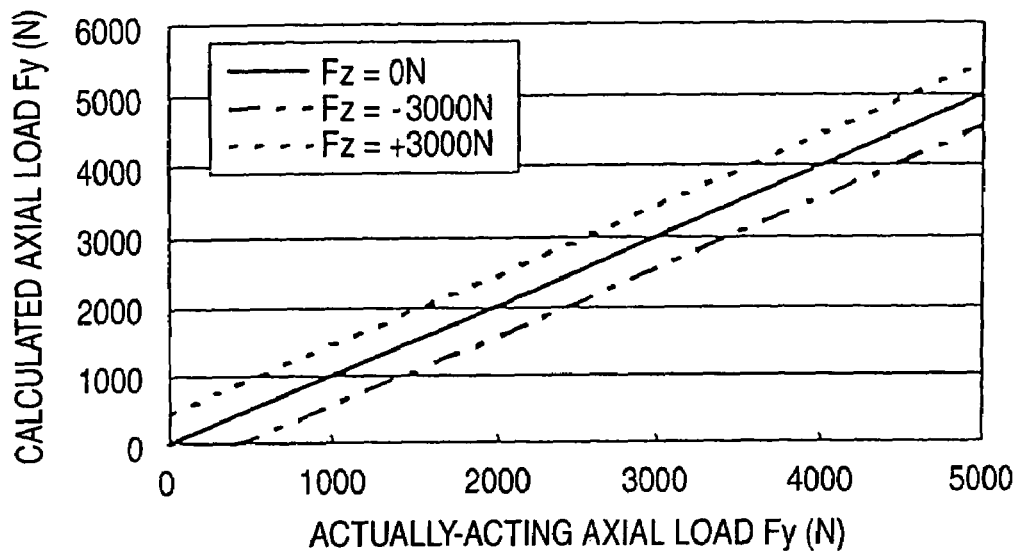
FIG. 13 is a diagram showing the case where the axial load is derived simply based on a difference between the revolution speeds in a state that a displacement exists in respective acting directions of the axial load and the radial load.
Figure 14:
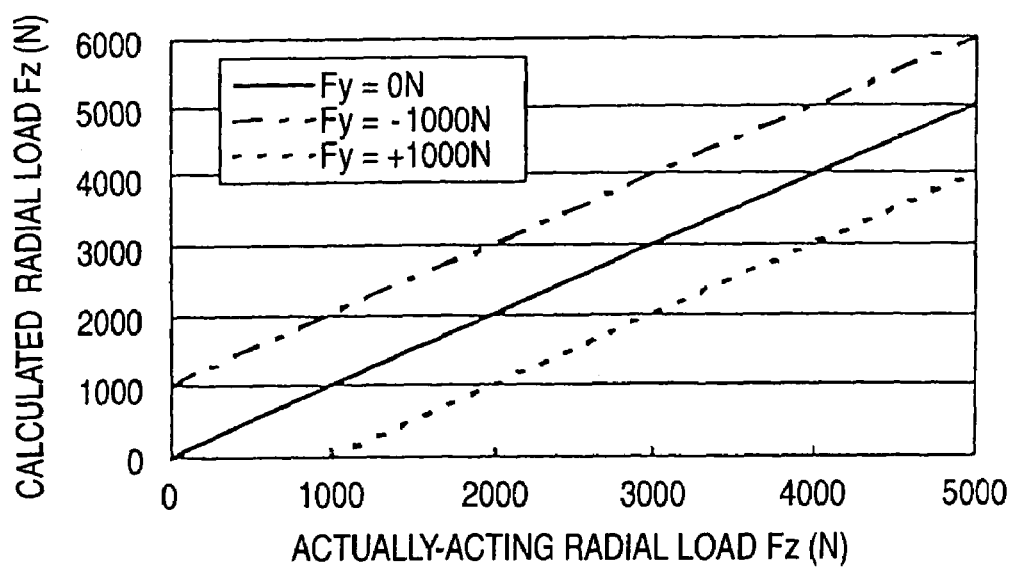
FIG. 14 is a diagram showing the case where the radial load is derived simply based on a sum of the revolution speeds in the similar state.

FIGS. 13 to 16 show results of the computer simulation that was executed to check the validity of the foregoing approach (b). This simulation was executed by setting both the contact angles $\alpha_a$, $\alpha_b$ of the rolling elements 9a, 9b in both rows to 40 degree under the condition that the radial load $F_z$ is applied to the position that is out of the center position and its vicinity between the rolling elements 9a, 9b in both rows and the axial load is applied to the that is out of the center portion of the rolling bearing unit, as shown in above FIG. 7. First, FIG. 13 shows results of the calculated axial load $F_y$ derived based on a difference between the revolution speeds $\epsilon_a$, $\epsilon_b$ of the rolling elements 9a, 9b in both rows in the case where the radial load $F_z$ is changed in three ways of −3000 N, 0 N, +3000 N. Also, FIG. 14 shows results of the calculated radial load $F_z$ derived based on a sum of the revolution speeds $\epsilon_a$, $\epsilon_b$ of the rolling elements 9a, 9b in both rows in the case where the axial load $F_y$ is changed in three ways of −1000 N, 0 N, +1000 N. In both cases, the precise value could be calculated if the load that is not the object of sensing is 0, neverthless the major error was made in the calculated value by the influence (crosstalk) if the load that is not the object of sensing exists.

Figure 15:
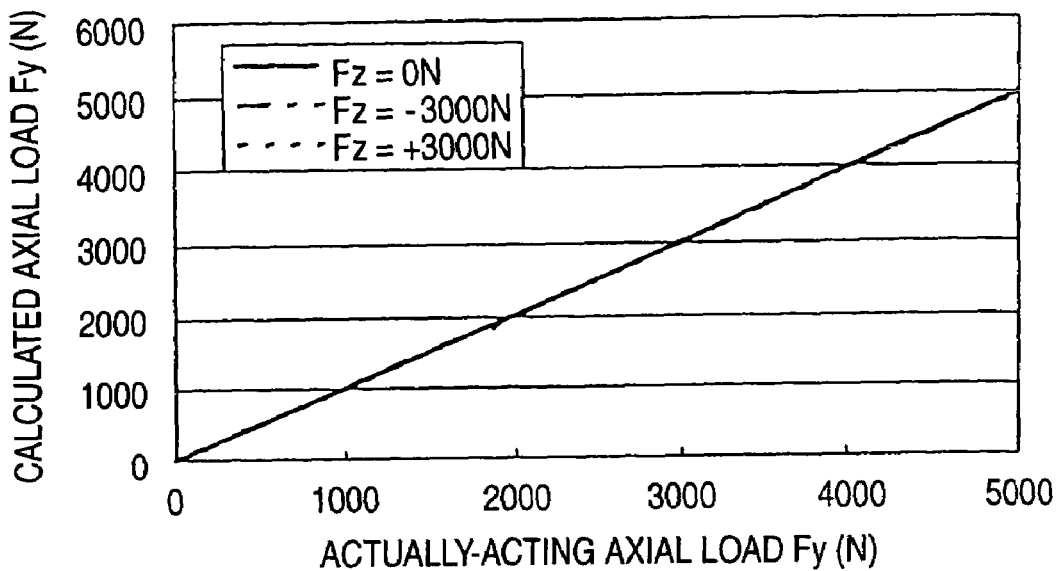
FIG. 15 is a diagram showing the case where the axial load is derived based on a difference between the revolution speeds in view of an influence coefficient in a state that a displacement exists in respective acting directions of the axial load and the radial load.
Figure 16:
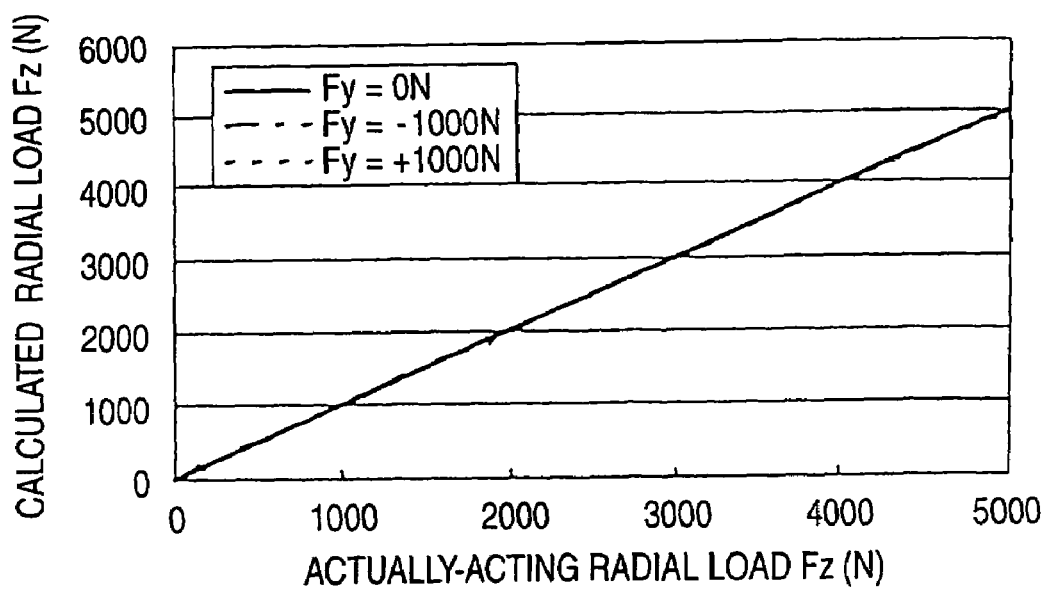
FIG. 16 is a diagram showing the case where the radial load is derived based on a sum of the revolution speeds in the similar state.

In contrast, results shown in FIGS. 15 and 16 were obtained under the same condition if the above approach (b) is employed. Thus, it was checked that the load can be calculated precisely without the influence of the crosstalk.

INDUSTRIAL APPLICABILITY

The present invention is not limited to the load measuring unit for the rolling bearing unit used to measure the load applied to the rolling bearing unit that supports the wheel of the car, as illustrated in the embodiments, and can be utilized to calculate the loads (the radial load and the axial load) acting upon various rotating machines such as the machine tool, the industrial equipment, and so on.

The invention claimed is:

1. A load measuring unit for a rolling bearing unit comprising:
    a stationary ring;
    a rotating ring arranged concentrically with the stationary ring;
    a plurality of rolling elements provided rotatably between stationary-side raceways and rotating-side raceways, which are formed on mutual opposing portions of the stationary ring and the rotating ring in two rows or more respectively, respectively to direct a contact angle in an opposite direction mutually at least between a pair of rows;
    at least a pair of revolution speed sensors for sensing revolution speeds of rolling elements, directions of contact angles of which are different mutually, in a pair of rows respectively; and
    a calculator for calculating a load applied between the stationary ring and the rotating ring based on sensed signals fed from the revolution speed sensors;
    wherein the contact angles of the rolling elements are differentiated mutually in respective rows.

2. A load measuring unit for a rolling bearing unit comprising:
    a stationary ring;
    a rotating ring arranged concentrically with the stationary ring;
    a plurality of rolling elements provided rotatably between stationary-side raceways and rotating-side raceways, which are formed on mutual opposing portions of the stationary ring and the rotating ring in two rows or more respectively, respectively to direct a contact angle in an opposite direction mutually at least between a pair of rows;
    at least a pair of revolution speed sensors for sensing revolution speeds of rolling elements, directions of contact angles of which are different mutually, in a pair of rows respectively; and
    a calculator for calculating a load applied between the stationary ring and the rotating ring based on sensed signals fed from the revolution speed sensors;
    wherein the contact angles of the rolling elements are differentiated mutually in respective rows, and
    wherein the rotating ring is a hub that fixes a wheel of a car to a rotary-side flange, which is fixed to an outer peripheral surface of an outer end portion in an axial direction, to rotate together with the wheel, and the contact angle of the rolling element in an inner row in the axial direction are set larger than the contact angle of the rolling element in an outer row in the axial direction.

3. A load measuring unit for a rolling bearing unit comprising:
    a stationary ring;
    a rotating ring arranged concentrically with the stationary ring;
    a plurality of rolling elements provided rotatably between stationary-side raceways and rotating-side raceways, which are formed on mutual opposing portions of the stationary ring and the rotating ring in two rows or more respectively, respectively to direct a contact angle in an opposite direction mutually at least between a pair of rows;
    at least a pair of revolution speed sensors for sensing revolution speeds of rolling elements, directions of contact angles of which are different mutually, in a pair of rows respectively; and
    a calculator for calculating a load applied between the stationary ring and the rotating ring based on sensed signals fed from the revolution speed sensors;
    wherein an expression representing a relationship between a variation of the load and an amount of change in the revolution speeds of the rolling elements in respective rows based on a displacement of the load applied between the stationary ring and the rotating ring is installed into the calculator, and the calculator calculates the load based on the expression.

4. A load measuring unit for a rolling bearing unit according to claim 3, wherein the rotating ring is a hub that fixes a wheel of a car to a rotary-side flange, which is fixed to an outer peripheral surface of an outer end portion in an axial direction, to rotate together with the wheel.

5. A load measuring unit for a rolling bearing unit comprising:
    a stationary ring;
    a rotating ring arranged concentrically with the stationary ring;
    a plurality of rolling elements provided rotatably between stationary-side raceways and rotating-side raceways, which are formed on mutual opposing portions of the stationary ring and the rotating ring in two rows or more respectively, respectively to direct a contact angle in an opposite direction mutually at least between a pair of rows;
    at least a pair of revolution speed sensors for sensing revolution speeds of rolling elements, directions of contact angles of which are different mutually, in a pair of rows respectively;
    a calculator for calculating a load applied between the stationary ring and the rotating ring based on sensed signals fed from the revolution speed sensors,
    wherein the contact angles of the rolling elements are differentiated mutually in respective rows; and
    a rotational speed sensor for sensing rotational speed of the rotating ring,
    wherein the calculator calculates the rotational speed of the rotating ring based on signals fed from the rotational speed sensor, and calculates the load applied between the stationary ring and the rotating ring based on ratios of the revolution speeds of the rolling elements in respective rows to the rotational speed.

6. A load measuring unit for a rolling bearing unit comprising:

a stationary ring;

a rotating ring arranged concentrically with the stationary ring;

a plurality of rolling elements provided rotatably between stationary-side raceways and rotating-side raceways, which are formed on mutual opposing portions of the stationary ring and the rotating ring in two rows or more respectively, respectively to direct a contact angle in an opposite direction mutually at least between a pair of rows;

at least a pair of revolution speed sensors for sensing revolution speeds of rolling elements, directions of contact angles of which are different mutually, in a pair of rows respectively;

a calculator for calculating a load applied between the stationary ring and the rotating ring based on sensed signals fed from the revolution speed sensors, wherein an expression representing a relationship between a variation of the load and an amount of change in the revolution speeds of the rolling elements in respective rows based on a displacement of the load applied between the stationary ring and the rotating ring is installed into the calculator, and the calculator calculates the load based on the expression; and a rotational speed sensor for sensing rotational speed of the rotating ring, wherein the calculator calculates the rotational speed of the rotating ring based on signals fed from the rotational speed sensor, and calculates the load applied between the stationary ring and rotating ring based on ratios of the revolution speeds of the rolling elements in respective rows to the rotational speed.

* * * * *